March 14, 1961  H. R. MURPHY  2,974,471
LAWN EDGER
Filed Jan. 6, 1959  2 Sheets-Sheet 1

Harry R. Murphy
INVENTOR.

BY Clarence A. O'Brien
and Harvey B. Jacobson
Attorneys

March 14, 1961  H. R. MURPHY  2,974,471
LAWN EDGER

Filed Jan. 6, 1959  2 Sheets-Sheet 2

Harry R. Murphy
INVENTOR.

United States Patent Office 2,974,471
Patented Mar. 14, 1961

2,974,471
LAWN EDGER
Harry R. Murphy, 705 Doris Circle, Montgomery, Ala.
Filed Jan. 6, 1959, Ser. No. 785,202
5 Claims. (Cl. 56—25.4)

This invention relates generally to garden equipment and more particularly to equipment designed to be utilized in the maintenance of lawns for edging lawns along concrete driveways, sidewalks, and the like.

Expereince has indicated that problems arise in the maintenance of large lawns relative to the edging of the lawn adjacent concrete strips. More particularly, where power lawn mowers are utilized to maintain lawns having large perimeters adjacent concrete strips, it has been found that the job of properly edging the lawn adjacent concrete strips is laborious and tedious. Numerous methods have been attempted to edge lawns but apparently none of them have proven satisfactory. For example, attempts have been made to cut grooves immediately adjacent the concrete strips. However, it has been found that the grooves act to form gutters wherein soil erosion occurs during heavy rain falls. Other attempts that have been made include the utilization of attachments for lawn mowers which include rotary disk-type cutters which cut along the edge of a concrete strip to trim the lawn edge. In that it is necessary to run the mower immediately adjacent the concrete strip, the reel or cutter bar of the mower often becomes damaged when coming into contact with the concrete. Accordingly, the applicant herein has devised a novel lawn edger which appears to obviate the above noted difficulties.

The principal object of this invention is to provide a novel construction in lawn edgers which facilitates the maintenance of large lawns adjacent concrete strips.

A further object of this invention is to provide a novel and improved lawn edger construction which is efficient and easy to operate.

A further object of this invention is to provide a novel and improved lawn edger construction wherein the cutting elements are readily adjustable to effect the desired cut.

A still further object of this invention is to provide a novel and improved lawn edger construction which is reliable, and simple and inexpensive to manufacture and operate.

In accordance with the above stated objects below is particularly described the construction and operation of a novel and improved lawn edger which initially includes a base frame supported by a pair of rotatable ground wheels. The base frame supports a power source which may be a gasoline engine or an electric motor and has a handle attached thereto for facilitating the motivation of the lawn edger. The power source is operatively connected to a drive spindle which terminally carries a cylindrically constructed wire brush. The drive spindle is adjustably supported relative to the base frame by an arm which is secured to a block which in turn is swivelly connected to the base frame. A brush frame is carried by the arm and encloses the brush and in turn supports therefrom a pair of cutting blades. One cutting blade is positioned on one side of the wire brush while a second cutting blade is positioned opposite thereto, on the other side of the brush. The blades are vertically adjustable relative to the brush frame for enabling the operator to establish the desirable depth of cut. Also, a shield is carried by the brush frame which extends over the brush to prevent the rotating brush from harming the operator. The entire construction is so arranged that the substantial weight is positioned forwardly of the ground wheels on the base frame so as to avoid damage to the brush and cutter blades positioned to the rear of the base frame. Also, it will be apparent that with the weight substantially forward of the ground wheels, it will be easier for the operator to motivate the lawn edger along a desired path.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
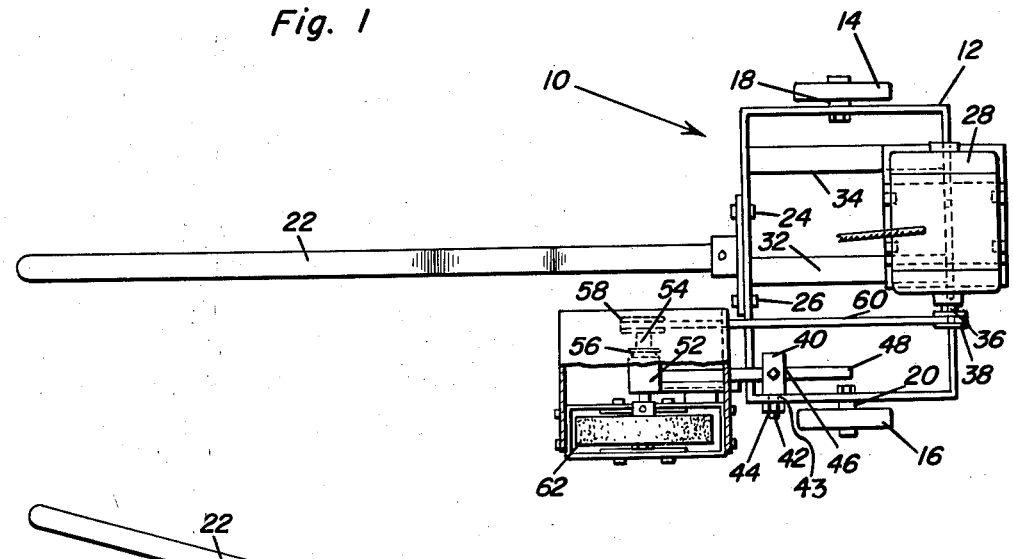
Figure 1 represents an elevational plan view, partially broken away, of the lawn edger.
Figure 2:
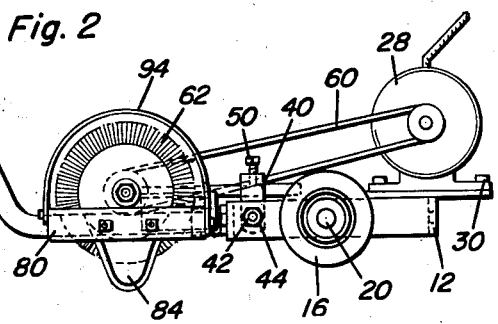
Figure 2 represents an elevational side view of the lawn edger.

With continuing reference to the drawings and initial reference to Figures 1 and 2, the numeral 10 generally represents the lawn edger comprising this invention and including a base frame 12 of generally rectangular construction supporting a pair of ground wheels 14 and 16 appropriately rotatably secured to the base frame 12 by shafts 18 and 20. A handle 22 fastened to the base frame 12 by bolts 24 and 26 is utilized to motivate the lawn edger 10 along the ground on rotatable wheels 14 and 16.

It will be noted that the shafts 18 and 20 of ground wheels 14 and 16 are aligned approximately at the transverse midpoint of the base frame 12. A power source 28 (illustrated as an electric motor but equally effective as gasoline engine) is secured to the base frame 12 by bolts 30 forward of the ground wheels 14 and 16. Braces 32 and 34 are preferably fastened to the base frame 12 to aid in supporting the power source 28. It will be noted that the power source 28 comprising the most substantial individual weight of the device, is positioned forward of the ground wheels 14 and 16 so as to tend to tip the device clockwise (looking at Figure 2) about the ground wheels 14 and 16 for reasons more apparent below.

The power source 28 has a rotatable drive shaft 36 operatively connected thereto having a pulley 38 rigidly fixed therewith.

A block 40 having a threaded projection 42 is fixed to the base frame 12 by passing the projection 42 through an aperture 43 in the base frame 12 and threadedly engaging the projection 42 with nut 44. It will be appreciated that projection 42, when nut 44 is loosened, is free to turn in the aperture in the base frame 12 so that block 40 is capable of swivelling relative to base frame 12 whereas by utilization of nut 44, the block 40 may be locked in a desired angular relationship relative to the base frame 12. The block 40 includes a bore 46 which passes an arm 48 therethrough. A set screw 50 communicates with the arm 48 in the bore 46 and locks the arm 48 relative to the block 40 so as to prevent slidable movement between the block 40 and arm 48.

Terminally fixed to the arm 48 is a collar 52 which passes drive spindle 54. A bearing 56 is provided to allow the drive spindle 54 to rotate within the collar 52.

A pulley 58 is terminally secured to the drive spindle 54. An endless belt 60 operatively connects the pulley 38 to the pulley 58 whereby the power source 28 may drive the drive spindle 54.

Terminally fixed to the drive spindle 54, opposite the pulley 58, is a cylindrical wire brush 62. Of course, it will be apparent that since the brush 62 is rigidly affixed to the spindle 54, as between the flange 64 and nut 66, the wire brush assembly will be driven rotatably thereby.

Figure 6:
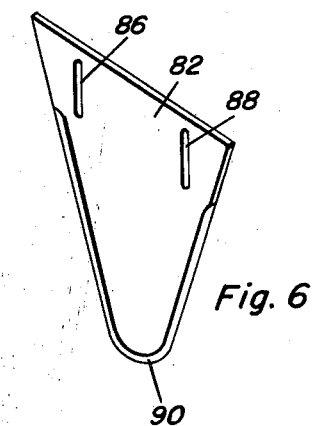
Figure 6 represents a perspective view of one of the pair of cutting blades.
Figure 3:
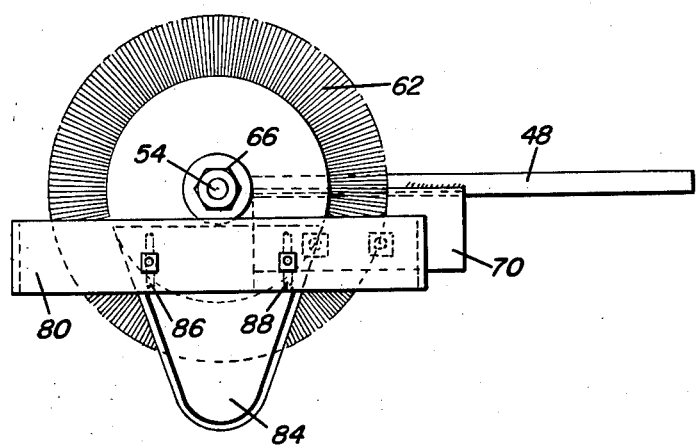
Figure 3 represents an elevational enlarged side view of the brush and blade assembly.
Figure 4:
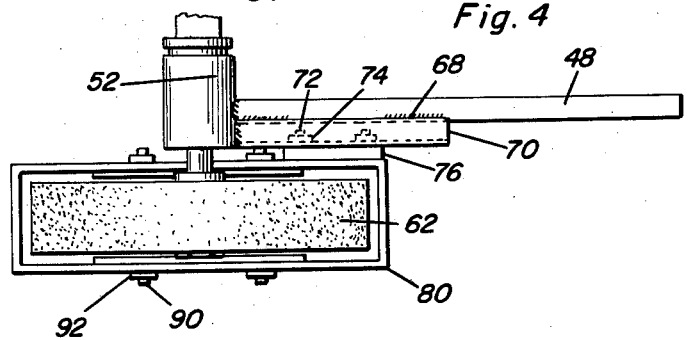
Figure 4 represents an elevational plan view of the brush and blade assembly.
Figure 5:
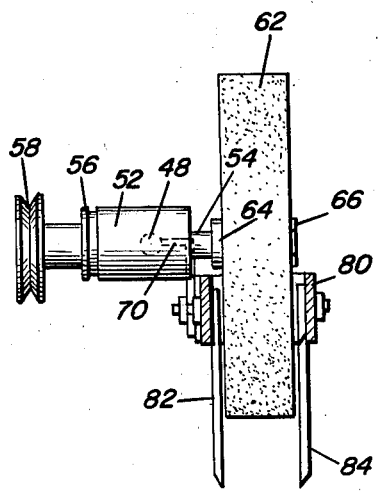
Figure 5 represents an elevational rear view of the brush and blade assembly.

Affixed to the arm 48 as by welding as at 68, is an angle iron 70. Secured to the angle iron 70 by bolts 72 and nuts 74 through spacer 76 is a brush frame 80. The frame 80 extends completely about the brush 62 beneath the axis of the drive spindle 54. Secured to the brush frame 80 on opposite sides of the brush 62 are a pair of cutting blades 82 and 84. More particularly referring to Figure 6, it will be noted that each of the cutting blades 82 and 84 includes vertical slots as at 86 and 88. The top surface of the blade is substantially flat while the bottom surface is honed as at 90. Apertures in the brush frame 80 are aligned with the slots 86 and 88 so that bolts 90 may be passed through the registered slots and apertures for receiving nuts 92 thereon. It will be apparent, that the blades 82 and 84 are accordingly vertically adjustable relative to the brush frame 80 whereby the depth of cut of the blades into the ground adjacent, for example, a concrete strip may be regulated as desired.

In order to provide greater protection for the operator against injury and damage to clothing, an arcuate shield 94 is secured to the brush frame 80 to enclose the rotating parts including the pulley 58 and brush 62.

In the operation and utilization of the lawn edger, an operator motivates the lawn edger 10 by handle 22 along the lawn adjacent a concrete strip. The blades 82 and 84 cut into the ground to a depth as predetermined by the vertical setting relative to the brush frame 80, while the rotating wire brush 62 efficiently and neatly trims the area it contacts. It will of course be realized that the device will have a tendency to tip clockwise about the ground wheels 14 and 16 due to the weight of the power source 28 forward of the wheels. This will facilitate the motivation of the lawn edger 10 and will prevent damage to the blades 82 and 84 and the brush 62. The operator is free to adjust the angularity of the arm 48 relative to the base frame 12 to position the blades 82 and 84 and brush 62 as desired. In order to maintain the proper tension on the belt 60 so as to efficiently transmit the power from the power source 28 to the drive spindle 54, the arm 48 is slidable in the bore 46 of block 40. It is thought that the operation and construction of the lawn edger should now be apparent to one skilled in the art.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A novel construction in lawn edgers comprising a base frame, a pair of ground wheels rotatably supported from said base frame, a handle connected to said base frame for facilitating the manual motivation of said base frame on said ground wheels, a power source carried by said base frame, a cylindrically constructed wire brush, a rotatable drive spindle terminally supporting said wire brush, and means connecting said power source to said drive spindle, an arm, swivel means on said base frame supporting said arm to allow said arm to be locked in angularly adjustable position relative to said base frame, said drive spindle terminally rotatably supported by said arm, said swivel means including a block, a cylindrical projection on said block extending perpendicularly thereto, said base frame defining an aperture, said aperture receiving said projection whereby said projection may turn in said aperture to swivel said block relative to said base frame, means carried by said projection for locking said projection in said aperture to prevent said projection from turning therein, said block including a bore, said bore slidably receiving said arm, said arm supporting a brush frame, said brush frame extending around said cylindrical brush, a pair of cutting blades, said blades adjustably depending from said brush frame with said brush therebetween.

2. A novel construction in lawn edgers comprising a base frame, a pair of ground wheels rotatably supported from said base frame, a handle connected to said base frame for facilitating the manual motivation of said base frame on said ground wheels, a power source carried by said base frame, a cylindrically constructed wire brush, a rotatable drive spindle terminally supporting said wire brush, and means connecting said power source to said drive spindle, an arm, swivel means on said base frame supporting said arm to allow said arm to be locked in angularly adjustable position relative to said base frame, said drive spindle terminally rotatably supported by said arm, said swivel means including a block, a cylindrical projection on said block extending perpendicularly thereto, said base frame defining an aperture, said aperture receiving said projection whereby said projection may turn in said aperture to swivel said block relative to said base frame, means carried by said projection for locking said projection in said aperture to prevent said projection from turning therein, said block including a bore, said bore slidably receiving said arm, said arm supporting a brush frame, said brush frame extending around said cylindrical brush, a pair of cutting blades, said blades adjustably depending from said brush frame with said brush therebetween, said blades defining slots, said brush frame defining apertures receiving bolts, said slots and apertures in registry whereby said slots may receive said bolts so that said blades may slide vertically relative to said frame.

3. A novel construction in lawn edgers comprising a base frame, a pair of ground wheels rotatably supported from said base frame, a handle connected to said base frame for facilitating the manual motivation of said base frame on said ground wheels, a power source carried by said base frame, a cylindrically constructed wire brush, a rotatable drive spindle terminally supporting said wire brush, and means connecting said power source to said drive spindle, an arm, swivel means on said base frame supporting said arm to allow said arm to be locked in angularly adjustable position relative to said base frame, said drive spindle terminally rotatably supported by said arm, said arm supporting a brush frame, said brush frame extending around said cylindrical brush, a pair of cutting blades, said blades adjustably depending from said brush frame with said brush therebetween.

4. A novel construction in lawn edgers comprising a base frame, a pair of ground wheels rotatably supported from said base frame, a handle connected to said base frame for facilitating the manual motivation of said base frame on said ground wheels, a power source carried by said base frame, a cylindrically constructed wire brush, a rotatable drive spindle terminally supporting said wire brush, and means connecting said power source to said drive spindle, an arm, swivel means on said base frame supporting said arm to allow said arm to be locked in angularly adjustable position relative to said base frame, said drive spindle terminally rotatably supported by said arm, said arm supporting a brush frame, said brush frame extending around said cylindrical brush, a pair of cutting blades, said blades adjustably depending from said brush frame with said brush therebetween, said blades defining slots, said brush frame defining apertures receiving bolts, said slots and apertures in registry whereby said slots may receive said bolts so that said blades may slide vertically relative to said frame.

5. A novel construction in lawn edgers comprising a base frame, a pair of ground wheels rotatably supported from said base frame, a handle connected to said base frame for facilitating the manual motivation of said base frame on said ground wheels, a power source carried by said base frame, a cylindrically constructed wire brush, a rotatable drive spindle terminally supporting said wire brush, and means connecting said power source to said drive spindle, an arm, swivel means on said base frame supporting said arm to allow said arm to be locked in angularly adjustable position relative to said base frame, said drive spindle terminally rotatably supported by said arm, said arm supporting a brush frame, said brush frame extending around said cylindrical brush, a pair of cutting blades, said blades adjustably depending from said brush frame with said brush therebetween, said blades defining slots, said brush frame defining apertures receiving bolts, said slots and apertures in registry whereby said slots may receive said bolts so that said blades may slide vertically relative to said frame, and a shield supported by said brush frame extending over said brush.

References Cited in the file of this patent

UNITED STATES PATENTS

| | | |
|---|---|---|
| 2,084,398 | Jongeneel | June 22, 1937 |
| 2,663,137 | Asbury | Dec. 22, 1953 |
| 2,706,941 | Swanson | Apr. 26, 1955 |
| 2,718,742 | Tangeman | Sept. 27, 1955 |
| 2,752,841 | La Plante | July 3, 1956 |
| 2,906,080 | Light | Sept. 29, 1959 |

FOREIGN PATENTS

| | | |
|---|---|---|
| 429,702 | Great Britain | June 5, 1935 |
| 110,527 | Australia | May 3, 1940 |